US007636098B2

(12) United States Patent
Yang et al.

(10) Patent No.: US 7,636,098 B2
(45) Date of Patent: Dec. 22, 2009

(54) SALIENCE PRESERVING IMAGE FUSION

(75) Inventors: Qiong Yang, Beijing (CN); Chao Wang, Anhui (CN); Xiaoou Tang, Beijing (CN); Zhongfu Ye, Anhui (CN)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 11/536,513

(22) Filed: Sep. 28, 2006

(65) Prior Publication Data

US 2008/0080787 A1 Apr. 3, 2008

(51) Int. Cl.
G09G 5/00 (2006.01)
(52) U.S. Cl. ........................................ 345/629; 382/284
(58) Field of Classification Search .................. 345/634
See application file for complete search history.

(56) References Cited

U.S. PATENT DOCUMENTS

| | | | |
|---|---|---|---|
| 4,887,151 A | 12/1989 | Wataya | |
| 5,068,644 A | 11/1991 | Batson et al. | |
| 5,325,449 A * | 6/1994 | Burt et al. | 382/240 |
| 5,367,629 A | 11/1994 | Chu et al. | |
| 5,706,216 A | 1/1998 | Reisch | |
| 5,805,303 A | 9/1998 | Imaizumi et al. | |
| 5,852,673 A | 12/1998 | Young | |
| 5,909,251 A | 6/1999 | Guichard et al. | |
| 5,930,397 A | 7/1999 | Tsujii et al. | |
| 6,281,904 B1 | 8/2001 | Reinhardt et al. | |
| 6,438,261 B1 | 8/2002 | Moshe et al. | |
| 6,538,659 B2 | 3/2003 | Fujimura et al. | |
| 6,539,126 B1 * | 3/2003 | Socolinsky et al. | 382/274 |
| 6,658,146 B1 | 12/2003 | Iourcha et al. | |
| 6,898,331 B2 | 5/2005 | Tiana | |
| 7,298,379 B2 | 11/2007 | Xu et al. | |
| 2002/0181762 A1 | 12/2002 | Silber | |
| 2003/0208116 A1 | 11/2003 | Liang et al. | |
| 2004/0028283 A1 | 2/2004 | Prosi | |
| 2004/0258322 A1 | 12/2004 | Hong et al. | |
| 2005/0078881 A1 | 4/2005 | Xu et al. | |
| 2005/0089239 A1 | 4/2005 | Brajovic | |
| 2005/0094887 A1 | 5/2005 | Cakir et al. | |
| 2005/0122332 A1 | 6/2005 | Boyd et al. | |
| 2005/0129110 A1 | 6/2005 | Marquant et al. | |

(Continued)

FOREIGN PATENT DOCUMENTS

WO WO2006017233 A1 2/2006

(Continued)

OTHER PUBLICATIONS

Antunez, "Gradient-Based Dynamic Range Compression: Introduction", retrieved at http://www.scien.stanford.edu/class/psych221/projects/03/eantunez/introduction.html on May 1, 2006, written on Mar. 10, 2003, 2 pages.

(Continued)

*Primary Examiner*—Xiao M Wu
*Assistant Examiner*—Scott E Sonners
(74) *Attorney, Agent, or Firm*—Lee & Hayes, PLLC

(57) ABSTRACT

Salience-preserving image fusion is described. In one aspect, multi-channel images are fused into a single image. The fusing operations are based on importance-weighted gradients. The importance weighted gradients are measured using respective salience maps for each channel in the multi-channel images.

17 Claims, 4 Drawing Sheets

U.S. PATENT DOCUMENTS

| | | | |
|---|---|---|---|
| 2005/0163389 A1 | 7/2005 | Ohmi et al. | |
| 2005/0185826 A1 | 8/2005 | Georgescu et al. | |
| 2005/0232512 A1 | 10/2005 | Luk et al. | |
| 2005/0254722 A1* | 11/2005 | Fattal et al. | 382/274 |
| 2005/0265452 A1 | 12/2005 | Miao et al. | |
| 2005/0270784 A1 | 12/2005 | Hahn et al. | |
| 2005/0276498 A1 | 12/2005 | Chen et al. | |
| 2006/0002611 A1 | 1/2006 | Mantiuk et al. | |
| 2006/0062299 A1 | 3/2006 | Park et al. | |
| 2006/0104524 A1 | 5/2006 | Reid et al. | |
| 2007/0076971 A1 | 4/2007 | Roimela et al. | |

FOREIGN PATENT DOCUMENTS

| | | | |
|---|---|---|---|
| WO | WO2006018658 A2 | 2/2006 | |

OTHER PUBLICATIONS

Bala, et al., "Information-Preserving Imaging for Heterogeneous Networked Displays", CHI'06 International Conference, Apr. 22-27, 2006, 4 pages, Montreal, Canada.

Fattal, et al., "Gradient Domain High Dynamic Range Compression", ACM SIGGRAPH, 2002, 8 pages.

Gooch, et al., "Color2Gray: Salience-Preserving Color Removal", ACM SIGGRAPH, 2005, 6 pages, vol. 24, No. 3.

Socolinsky, "Dynamic range constraints in image fusion and visualization", Proceedings of Signal and Image Processing 2000, Nov. 2000, 6 pgs, Las Vegas, NV.

Diplom-Ingenieur et al., "Variable Block-Size Transforms for Hybrid Video Coding", Feb. 2004,184 pgs.

Girod et al., "Recent Advances in Video Compression", vol. 2, IEEE, May 12-15, 1996, pp. 1-4.

Vaisey, et al., "Image Compression with Variable Block Size Segmentation", IEEE Transactions on Signal Processing, vol. 40, No. 8, Aug. 1992, pp. 2040-2060.

Wang, et al., "Salience Preserving Image Fusion with Dyanmic Range Compression", Oct. 8-11, 2006, IEEE, pp. 1-4.

PCT Search Report for Patent Application No. PCT/US2007/079574, mailed on Jan. 30, 2008, 10 pgs.

Beers et al., "Rendering From Compressed Textures", Proceedings of 23rd Annual Conference on Computer Graphics and Interactive Techniques, 1996, pp. 373-378.

Larson et al., "The Log Luv Encoding for Full Gamut, High Dynamic Range Images", Journal of Graphic Tools, 1998.

Mantiuk et al., "Perception Motivated High Dynamic Range Video Encoding", ACM Transaxtions on Graphics, vol. 23, Iss. 3, Aug. 2004, pp. 733-741.

Storm et al., "iPackman High Quality Low Complexity Texture Compression for Mobile Phones", Proceedings of the ACM SIGGRAPH/EUROGRAPHICS Conference on Graphics Hardware, 2005, pp. 63-70.

Ward et al., "Subband Encoding of High Dynamic Range Imagery", Applied Perception in Graphics and Visualization, vol. 73, 2004, pp. 83-90.

* cited by examiner

SALIENCE PRESERVING IMAGE FUSION

BACKGROUND

Multi-channel image fusion and visualization operations are useful for many applications. For example, multi-channel image fusion can be used to fuse multiple images with different respective exposures, and therefrom, generate a single image with a high dynamic range (HDR). In image fusion, one of the most important issues is how to preserve the salience from the sources. Since gradient convey important salient features, we conduct the fusion on gradients. However, traditional fusion methods based on gradient treat gradients from multi-channels as a multi-valued vector, and compute associated statistics under the assumption of identical distribution. In fact, different source channels may reflect different important salient features, and their gradients are basically non-identically distributed. This prevents existing methods from successful salience preservation.

SUMMARY

Salience-preserving image fusion is described. In one aspect, multi-channel images are fused into a single image. The fusing operations are based on importance-weighted gradients. The importance weighted gradients are measured using respective salience maps for each channel in the multi-channel images.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Conventional multi-channel image fusion techniques based on gradients generally address gradients from multiple channels as a multi-valued vector, and compute associated statistics under an assumption of identical distribution. However, different source channels can reflect different important salient features, and corresponding gradients are non-identically distributed. This prevents existing image fusion techniques from successfully preserving salience. For example, when a minority of channels embody important features, such features may be obliterated by unimportant features embodied by the majority of channels.

Figure 1:
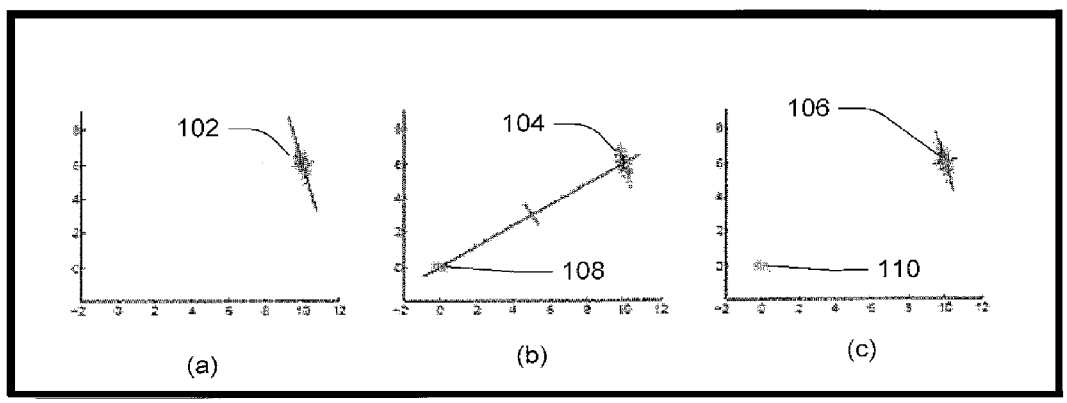
FIG. 1 shows an exemplary illustration of how identical distribution assumptions may cause salient features from certain channels to be obliterated by other channels, according to one embodiment

FIG. 1 shows an exemplary illustration of how identical distribution assumptions may cause salient features from certain channels to be obliterated by other channels, according to one embodiment. More particularly, FIG. 1 shows use of principal component analysis (PCA) to find a linear mapping on i.i.d and non i.i.d. samples. Referring to FIG. 1, dots 102 through 106 represent class 1 samples, and dots 108 through 110 represent class 2 samples. Lines through respective ones of the class samples represent component axis. FIG. 1(a) represents the PCA on i.i.d. samples. FIG. 1(b) represents PCA on double-distribution samples. FIG. 1(c) represents the weighted PCA on double-distribution samples in (b). Referring to these aspects of FIG. 1, and with respect to how identical distribution assumptions may cause salient features from certain channels to be obliterated by other channels, conventional target gradient can be deemed as a principal component of all source channel's gradients except for a normalization factor, if using the Euclidean metric. Assume that the samples are gradients at a given pixel from multiple channels. In FIG. 1(a), all channels manifest salient features, and PCA finds their principal component, thereby providing a good representation of the salient feature. But when there are some channels which have small gradients (class 2 dots 108 of FIG. 1(b)), the PCA results become meaningless (FIG. 1(b)).

In view of the above, systems and methods for salience preserving image fusion, which are described with respect to FIGS. 1(c) through 4, assign different weights to different channels; the more salient feature the channel conveys, the larger weight is assigned. This protects the important information from being obliterated by those unimportant, and thereby preserves salience in the channels properly in the fusion process. This is shown in FIG. 1(c), where the principal axis is quite close to that in FIG. 1(a) when we weight each sample by the square of its $l^2$-norm. Specifically, the systems and method for salience preserving image fusion preserve salient features in source images by first measuring a respective salience map for each source channel. The respective saliency measures are then used to weight each source channel's contribution to compute the statistical representation. The systems and methods use the weights to highlight gradients with high saliency in a target gradient, and thereby, preserve salient features in a resulting image. In one implementation, the systems and methods implement dynamic range compression on the target gradient to reduce the undesirable halo effects.

An Exemplary System

Although not required, systems and methods for salience preserving image fusion are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 2:
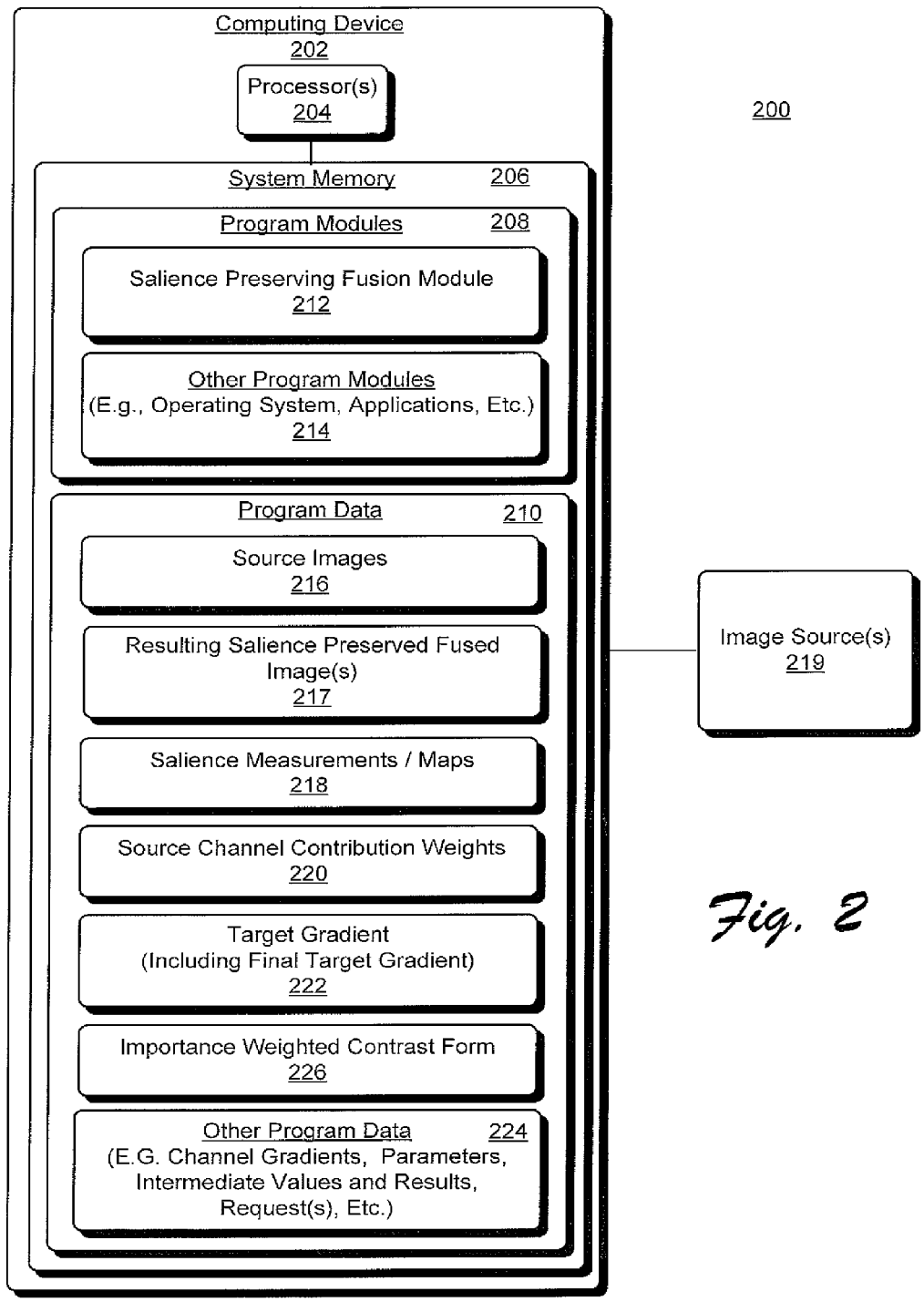
FIG. 2 shows an exemplary system for salience preserving image fusion, according to one embodiment.

FIG. 2 shows an exemplary system 200 for salience preserving image fusion, according to one embodiment. System 200 includes a computing device 202. Computing device 202 may be for example a general purpose computing device, a server, a laptop, a mobile computing device, and/or so on. Computing device 202 includes processor 204 coupled to system memory 206. Processor 204 may be a microprocessor, microcomputer, microcontroller, digital signal processor, etc. System memory 206 includes, for example, volatile random access memory (e.g., RAM) and non-volatile read-only memory (e.g., ROM, flash memory, etc.).

System memory 206 comprises program modules 208 and program data 210. Program modules 208 include, for example, salience preserving image fusion module 212 and "other program modules" 214 such as an Operating System (OS) to provide a runtime environment, one or more applications to leverage operations of salience preserving image fusion 212, device drivers, and/or so on. Such applications are arbitrary and could include any type of application that leverages co-registered multimodal imagery from diverse sources (e.g., magnetic resonance scanners, aerial and earth orbiting sensors, infrared and scientific-grade grayscale cameras, etc).

Salience preserving image fusion module 212 ("image fusion module 212") preserves salient features in source images 216 when fusing each channel of the source images 216 into a single resulting image 217. In this implementation, a single channel corresponds to one image. For example, an RGB channel is treated as three channels (one red channel, one green channel, and one blue channel), and thus, there are three images for image fusion operations. For the multi-exposures, there are multiple grayscale images where each grayscale image is treated as one channel. To preserve salient features in source images 216, image fusion module 212 first computes a respective salience map 218 for each channel gradient in each multi-channel source image 216 (hereinafter often referred to as "source images 216"). Each source image 216 is a co-registered multimodal digital image such as a photograph, a static image frame of a video sequence, etc. Digital images are defined by pixels, and pixels are representative of combinations of primary colors. A "channel" in this context is the grayscale image of the same size as the digital image, representing of just one of these primary colors. For example, a digital image in RGB space will have a red, a green and a blue channel, whereas a grayscale image has just one channel. There can be any number of primary colors in a digital image. Thus, a channel is a grayscale image based on any such primary color. Channel gradient is a distribution of color from low to high values (e.g., from black to white). In general, gradient provides a measure of overall contrast in an image, and to some extent, a measure of overall feature visibility and detail in a corresponding channel.

In one implementation, source images 216 are accessed or otherwise received by image fusion module 212 from an image source 219. Such image sources are arbitrary and may include any type of one or more image sources (e.g., digital imaging device(s), databases(s), etc.) that produce or otherwise store co-registered multi-channel digital images.

Image fusion module 212 utilizes respective ones of the saliency maps 218 (i.e., salience measures) to weight each source channel's contribution to the target gradient. For purposes of exemplary illustration, such weights are shown as "source channel contribution weights 220". In view of the source channel contribution weights 220, image fusion module 212 highlights gradients with high saliency in a target gradient 222, and thereby, preserves salient features in a resulting fused image 217. In one implementation, image fusion module 212 implements dynamic range compression operations on the target gradient 222 to reduce the undesirable halo effects.

These and other aspects for salience preserving image fusion are now described in greater detail.

Salience Preserving Fusion

Gradient Fusion with Salience Map

Importance weights based on salience map 218: Denote N-channel registered source images 216 as $\{f_k, k=1, 2, L, N\}$, wherein W represents a region of a whole image 216. Image fusion module 212 adjusts all source channels in each image 216 to have same mean gradients as a maximum mean gradient channel. This is so that the source channels can be compared and computed at the same level. For channel $f_k$, and for pixel p, fusion module 212 measures salience (i.e., respective ones of salience measurements 218) of p in $f_k$ as follows:

$$S_k(p) = \mean_{q \in Q^p}\{d(f_k(p), f_k(q))\}, \quad (1)$$

$$S_k(p) = \mathrm{rescale}\{1 - S_k(p)/\max_{q \in W}(S_k(q))\}, \quad (2)$$

where $Q_p$ is the neighborhood of pixel p; rescale is an operation to ensure dynamic range of $S_k$ is within [0, 1], $$\mathrm{rescale}(A) = (A - A_{min})/(A_{max} - A_{min}), \quad (3)$$

and d(a,b) is defined as $$d(a, b) = e^{-\frac{(b-a)^2}{2s^2}}. \quad (4)$$

("A" indicates the variable of the function rescale, $A_{min}$ and $A_{max}$ indicate the minimum and maximum of A, that is, the range of A is from $A_{min}$ to $A_{max}$—I.e., the same as "d(a, b)").

In this implementation, fusion module 212 sets $Q_p$ to be a 5×5 neighborhood of p, and $s^2=100$ (although different values can also be used). $S_k(p)$ represents contrast around p, thus measures local salience. $S_k(p)$ with a value closer to 1 means pixel p is more important within channel k. Fusion module 21 compares all the salience maps $S_k$, and assigns a normalized weight to each pixel in each channel as follows:

$$w_k(p) = \frac{S_k(p)^n}{\sqrt{\sum_{l=1}^{N}(S_l(p)^{2n})}}. \quad (5)$$

Here, $w_k$ is defined to be the importance weight of channel k. The positive parameter n indicates a degree that the fused gradient resonates with the channel of high salience.

Importance-weighted contrast form: Fusion module 212 constructs an importance-weighted contrast form 226 as follows:

$$C(p) = \begin{bmatrix} \sum_k \left(w_k(p)\frac{\partial f_k}{\partial x}\right)^2 & \sum_k w_k^2(p)\frac{\partial f_k}{\partial x} \times \frac{\partial f_k}{\partial y} \\ \sum_k w_k^2(p)\frac{\partial f_k}{\partial x} \times \frac{\partial f_k}{\partial y} & \sum_k \left(w_k(p)\frac{\partial f_k}{\partial y}\right)^2 \end{bmatrix} \quad (6)$$

This is rewritten as $$\left\{ \begin{array}{cccc} w_1 \frac{\partial f_1}{\partial x} & w_2 \frac{\partial f_2}{\partial x} & L & w_N \frac{\partial f_N}{\partial x} \\ w_1 \frac{\partial f_1}{\partial y} & w_2 \frac{\partial f_2}{\partial y} & L & w_N \frac{\partial f_N}{\partial y} \end{array} \right\} \left\{ \begin{array}{cc} w_1 \frac{\partial f_1}{\partial x} & w_1 \frac{\partial f_1}{\partial y} \\ w_2 \frac{\partial f_2}{\partial x} & w_2 \frac{\partial f_2}{\partial y} \\ M & M \\ w_N \frac{\partial f_N}{\partial x} & w_N \frac{\partial f_N}{\partial y} \end{array} \right\} \quad (7)$$

From a statistical perspective, if $$\left( \frac{\partial f_k}{\partial x}, \frac{\partial f_k}{\partial y} \right)^T, k = 1, 2, \ldots N$$

are used as the samples, the contrast form C(p) is exactly a weighted covariance matrix of the samples with the weight $w_k(p)$, that is, for each pixel p, if we deem the gradients from N channels as N samples $$\left\{ \left( \frac{\partial f_k}{\partial x}, \frac{\partial f_k}{\partial y} \right)^T, k = 1, 2, \ldots N \right\}$$

with some distribution, and we weight these samples by $w_k$, then the covariance matrix of weighted samples is exactly C(p).

Target gradient field: Fusion module 212 constructs target gradient V(p)—i.e., target gradient 222—at pixel p, using eigen-decomposition on C(p) as follows:

$$C(p)u(p) = \lambda(p)u(p), \; st. \begin{cases} \|u(p)\|_2 = 1 \\ u(p)^T \left( \sum_k \nabla f_k(p) \right) > 0 \end{cases} \quad (8)$$

$$V(p) = \sqrt{\lambda(p)} \, u(p)$$

where λ(p) is the largest eigenvalue of c(p), and u(p) is the corresponding eigenvector. The target gradient V (122) is the principle component of the source channels' gradients weighted by their importance, which is the optimal representation for the weighted gradients in the sense of least-mean-square-error. Fusion module 212, by applying the importance weight as equation (5) on the contrast form 226, preserves the salience of the sources in the field of the target gradient 222.

Figure 3:
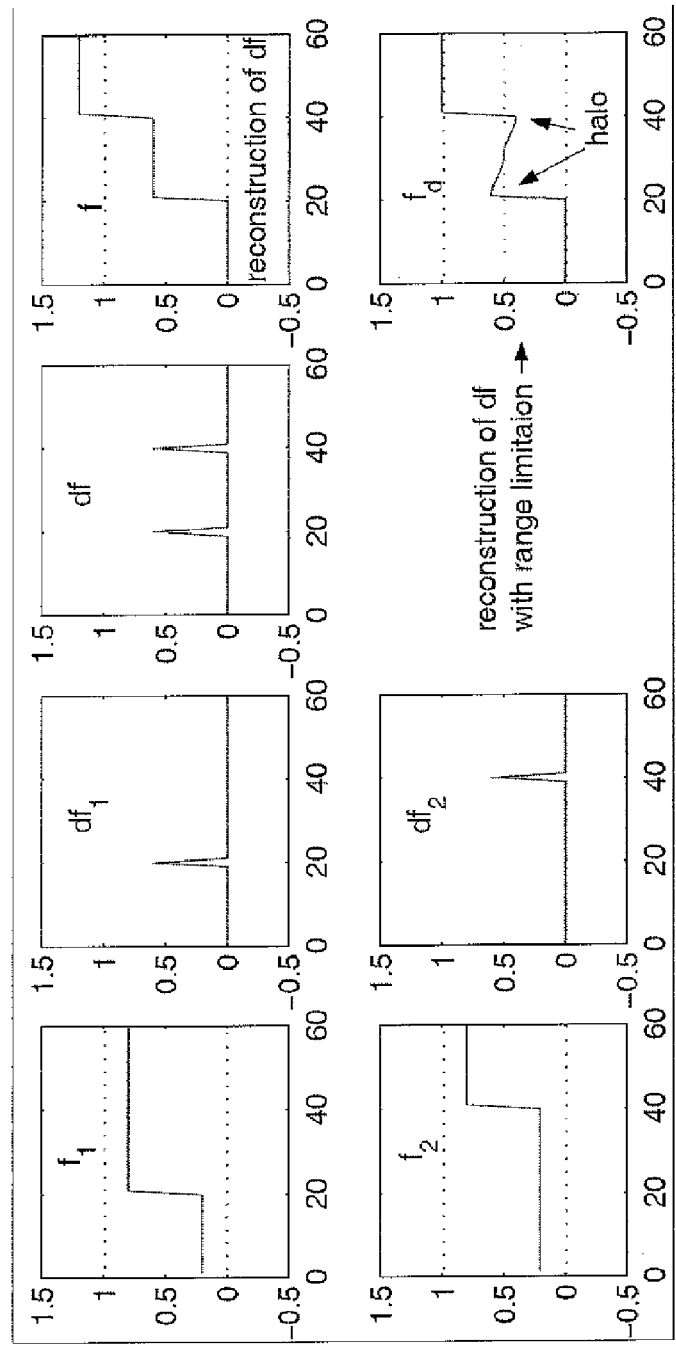
FIG. 3 shows an exemplary set of graphs illustrating origination of halo effects in gradient visualization, according to one embodiment.

Dynamic Range Compression for Halo Reduction: FIG. 3 shows an exemplary set of graphs illustrating origination of halo effects in gradient visualization, according to one embodiment. Since source images 216 are fused in the gradient field, and not directly by intensity, rendering the resulting images 217 to a display device with a dynamic range that is less than the dynamic range of the resulting image(s) 217 may cause visualization issues such as undesired image "halos". A one-dimensional example is shown in FIG. 3. Assume the dynamic range is [0,1]. $f_1$ and $f_2$ are two source signals, with a same step at different locations. After their gradients $df_1$ and $df_2$ are fused by max operation, denoted as df, direct reconstruction leads to a result f exceeding the range [0,1]. In view of a dynamic range limitation, the limitation represents a hard constraint causing halos to occur at sharp jumps in the result $f_d$. Such halos result in degradation in the visual perception. Thus, in one implementation, fusion module 212 controls the range of the target gradient 222 for halo reduction.

In view of the above, a gradient V may be over-enlarged, and thus, may result in halo artifacts. Since a large gradient can be still easily perceived after slight attenuation, and a slight boost on the small gradient can help improve the weak detail, in one implementation fusion module 212 modifies the target gradient 222 as follows:

$$V^*(p) = \left( \frac{a}{|V(p)|} \right)^{1-b} \times V(p) \quad (8)$$

This is a two-parameter family of functions. The parameter b is within (0, 1); the parameter controls strength of the attenuation for large gradients (also the strength of boost for small gradients). Parameter a determines which gradient magnitudes remain unchanged (multiplied by a scale factor of 1). Gradients of magnitude larger than a are attenuated, while gradients of magnitude smaller than a are slightly magnified. In one implementation, b is set to 0.8, and a=0.8×mean{|V|}, although in different implementations different parameter values can be used.

A modified gradient V* may result in halo reduction in general. Since the strong edges can also be easily observed, the target V* preserves the salience, and fusion module 212 uses V* as the final target gradient 222, as now described.

Reconstruction from target gradient: Given a target gradient V* (122), a fused result (i.e., a resulting fused image 217) is a two-dimension (2D) function g which minimizes the following:

$$\partial_W |\tilde{N}g - V^*|^2 dW, g(x,y) \hat{I}[0,255] \quad (9)$$

Eq. (9) is the objective function, which says, we'd like to find an image whose gradient has the least mean square error to the target gradient V*. Fusion module 212 solves function (9) iteratively as follows:

$$\begin{cases} g(p)^{t+\frac{1}{2}} = g(p)^t + \frac{1}{4}(Dg^t(p) - div V^*(p)) \\ g(p)^{t+\frac{1}{2}} = \max\left(0, \min\left(255, g(p)^{t+\frac{1}{2}}\right)\right) \end{cases} \quad (10)$$

Eq. (10) is a classical numerical algorithm to implement the optimization process. When the iteration stops, the final g(p) is the resulting fused image 217. For purposes of exemplary illustration, such a final fused image is shown as a respective portion of "other program data" 224. In general, operation of (9) and (10) fuse the information (salient features) from multiple source images in the computation of final target gradient V*. In this step, the image is reconstructed from a gradient. Please note that this approach is presented in a general mathematical form, so it can be implemented to an arbitrary number of channels in multi-channel source images 216.

An Exemplary Procedure

Figure 4:
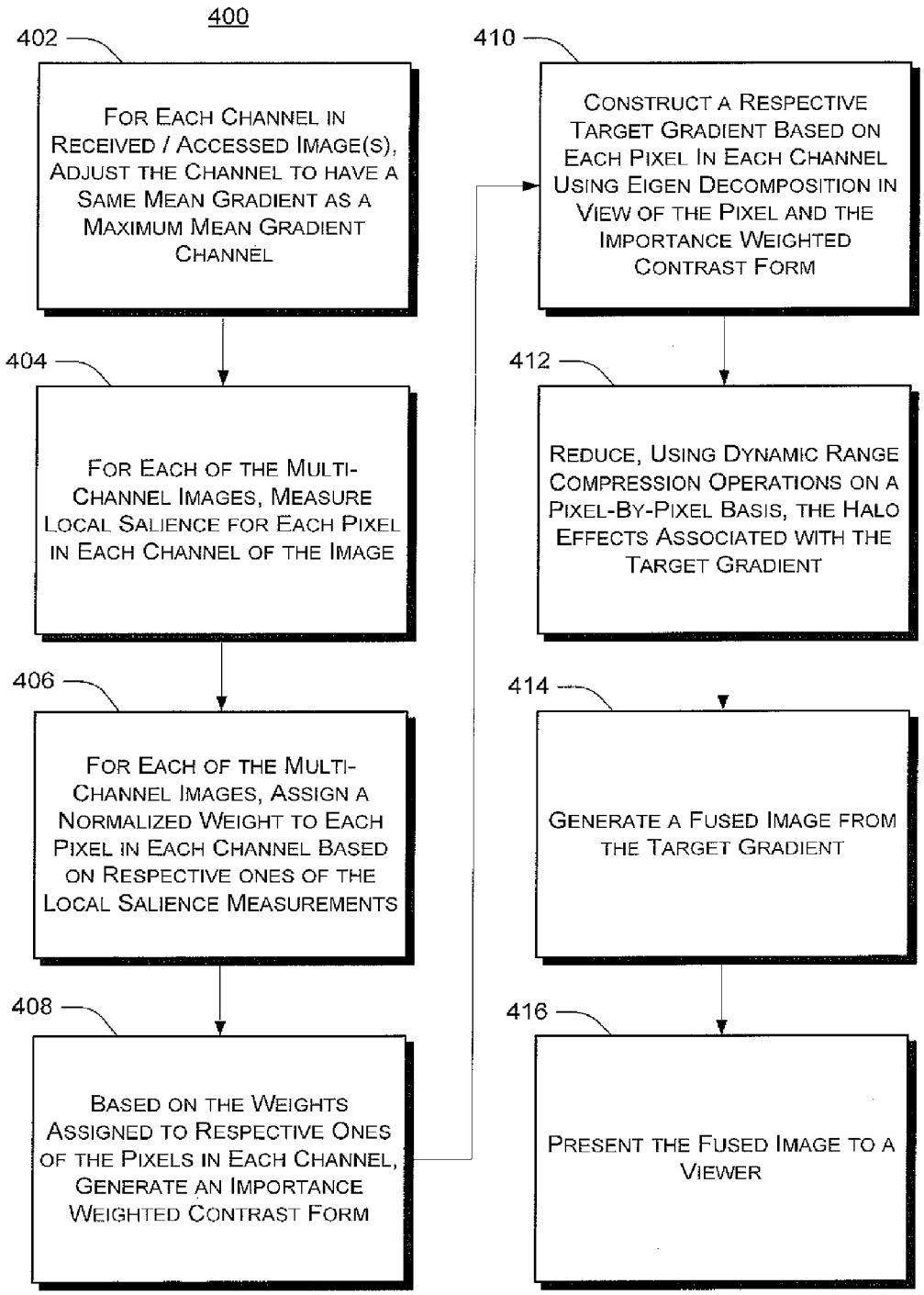
FIG. 4 shows an exemplary procedure for salience preserving image fusion, according to one embodiment.

FIG. 4 shows an exemplary procedure 400 for salience preserving image fusion, according to one embodiment. For purposes of discussion, the operations of FIG. 4 are described in reference to FIG. 2. For instance, in the description, the left-most digit of a component (computer program modules, devices, data, etc.) or operation reference number identifies the particular figure in which the component or operation first appears. For example, with respect to fusion module 212, the leftmost digit of the fusion module 212 is a "1", indicating that fusion module 212 is first presented and described with respect to FIG. 2. In one implementation, fusion module 212 implements at least a subset of the operations of procedure 400. For example, although fusion module 212 may implement operations associated with blocks 402 through 416, in one implementation, a different application implements the operations of block 416 to render or present the salience-preserved fused image(s) generated by fusion module 212.

Referring to FIG. 4, at block 402, for each channel in each image in a set of multi-channel images 216, adjust the channel to have the same mean gradient as a maximum mean gradient channel. Operations of block 404, for each of the multi-channel images, measures local salience for each pixel in each channel of the image. Such local salience measurements are shown by salience measurements/maps 218 of FIG. 2. Operations of block 406, for each of the multi-channel images, assigns a normalized weight to each pixel in each channel based on respective ones of the local salience measurements. Operations of block 408, based on the weights assigned to respective ones of the pixels in each channel (each of the images), generates an importance weighted contrast form 226. Operations of block 410 construct a target gradient 222 based on each pixel in each of the multi-channel images 216. This is accomplished, for each pixel, using Eigen decomposition in view of the pixel and importance weighted contrast form 226.

Operations of block 412 reduce, using dynamic range compression operations on a pixel-by-pixel basis, the halo effects associated with the target gradient 222. Operations of block 414, generate a salience-preserved fused image from the target gradient 222. Operations of block 416 present to the salience-preserved fused image to a viewer.

Alternate Implementations

Color removal operations are similar to image fusion in the sense that the information from ROB channels is integrated into a single channel. As a simple example, and in one implementation, fusion module 212 implements the above described image fusion operations to perform the task of color removal. For example, in one implementation, fusion module 212 implements RGB fusion using the above described techniques to remove color from source images 212. In one implementation, these color removal operations are responsive to receiving a request from an application 214 to remove color from a set of multi-channel source images 216.

CONCLUSION

Although salience preserving image fusion has been described in language specific to structural features and/or methodological operations or actions, it is understood that the implementations defined in the appended claims are not necessarily limited to the specific features or actions described. Rather, the specific features and operations discussed above with respect to FIGS. 1(*c*) through 4 are disclosed as exemplary forms of implementing the claimed subject matter.

The invention claimed is:

1. A method at least partially implemented by a computer, the method comprising:

fusing multi-channel images into a single image based on importance-weighted gradients, each multi-channel image comprising multiple channels, the fusing comprising:

for each channel in each image of the multi-channel images:

adjusting the channel to have a same mean gradient as a maximum mean gradient channel;

measuring local salience for respective pixels in the channel;

assigning a normalized weight to each pixel of the pixels based on respective ones of the local salience measurements;

generating an importance weighted contrast form based on normalized weights associated with respective ones of the pixels in the channels;

constructing, using the importance weighted contrast form, a target gradient based on pixels in each of the channels; and creating the single image from the target gradient;

wherein the importance weighted gradients are measured using respective salience maps for each channel in the multi-channel images.

2. The method of claim 1, wherein constructing the target gradient is accomplished using pixel-based Eigen decomposition operations in view of the importance weighted contrast form.

3. The method of claim 1, wherein the method further comprises removing halo effects associated with the target gradient.

4. The method of claim 3, wherein removing the halo effects further comprises implementing dynamic range compression operations on a pixel-by-pixel basis.

5. The method of claim 1, wherein fusing the multi-channel images removes color from the single image.

6. The method of claim 1, wherein the method further comprises presenting the single image to a viewer.

7. A computer-readable medium comprising computer-program instructions executable by a processor, the computer-program instructions, when executed, for performing operation comprising: for each image in a set of source images, each image comprising multiple channels of pixel information: adjusting each channel of the multiple channels in each image of the source images to have a same mean gradient as a maximum mean gradient channel so that the multiple channels are compared and computed at a same gradient level; calculating a respective salience map of multiple salience maps for a gradient of each channel in the image; weighting, based on respective ones of multiple salience maps, respective contributions of each channel of the multiple channels; and highlighting, based on the weighted contribution of each channel, gradients with high saliency in a target gradient to preserve salient features in a single image.

8. The computer-readable medium of claim 7, wherein the gradients are represented in the importance weighted contrast form, and wherein highlighting the gradients with high saliency in the target gradient further comprises:

constructing, using the importance weighted contrast form, the target gradient based on pixels in each of the channels; and fusing the single image from the target gradient.

9. The computer-readable medium of claim 7, wherein the computer-program instructions further comprise instructions for removing halo effects from the target gradient.

10. The computer-readable medium of claim 7, wherein the computer-program instructions further comprise instructions for implementing dynamic range compression operations to remove halo effects.

11. The computer-readable medium of claim 7, wherein the computer-program instructions for calculating the salience maps, weighting the respective contributions, and highlighting the gradients with high saliency are implemented responsive to receiving a request to remove color from respective ones of the source images.

12. The computer-readable medium of claim 7, wherein the computer-program instructions further comprise instructions for presenting the single image to a viewer.

13. A computing device comprising:
   a processor; and
   a memory coupled to the processor, the memory comprising computer-program instructions executable by the processor for implementing operations comprising:
   receiving multiple multi-channel images, each multi-channel image comprising multiple channels of pixel information;
   adjusting each of the multiple channels to have a same mean gradient as a maximum mean gradient channel; and
   calculating local salience measurements for respective pixels in each of the multiple channels; and
   fusing gradients from the multiple channels associated with each of the multi-channel images into a salience-preserving fused image based on the local salience measurements for the respective pixels in each of the multiple channels.

14. The computing device of claim 13, further comprising presenting the salience-preserving fused image to a viewer.

15. The computing device of claim 14, further comprising for each of the multi-channel images, assigning a normalized weight to each pixel in each channel of the multiple channels based on respective ones of the local salience measurements.

16. The computing device of claim 15, further comprising:
   generating an importance weighted contrast form based on normalized weights associated with respective ones of the pixels in the channels; and
   constructing, using the importance weighted contrast form, a target gradient based on pixels in each of the channels.

17. The computing device of claim 16 further comprising reducing, using dynamic range compression operations, halo(s) associated with the target gradient.

* * * * *